Jan. 19, 1960 W. L. GARBERDING 2,921,414
MEANS FOR INFEEDING A CENTERLESS GRINDER
Filed July 21, 1958 6 Sheets-Sheet 1

INVENTOR.
WALDO L. GARBERDING
BY
Hill, Sherman, Meroni, Gross & Simpson
ATTORNEYS Jan. 19, 1960 W. L. GARBERDING 2,921,414
MEANS FOR INFEEDING A CENTERLESS GRINDER
Filed July 21, 1958 6 Sheets-Sheet 3

INVENTOR.
WALDO L. GARBERDING
BY
ATTORNEYS

Jan. 19, 1960 W. L. GARBERDING 2,921,414
MEANS FOR INFEEDING A CENTERLESS GRINDER
Filed July 21, 1958 6 Sheets-Sheet 4

INVENTOR.
WALDO L. GARBERDING
BY
ATTORNEYS

Jan. 19, 1960 W. L. GARBERDING 2,921,414
MEANS FOR INFEEDING A CENTERLESS GRINDER
Filed July 21, 1958 6 Sheets-Sheet 5

INVENTOR.
WALDO L. GARBERDING
BY
ATTORNEYS

United States Patent Office 2,921,414
Patented Jan. 19, 1960

2,921,414
MEANS FOR INFEEDING A CENTERLESS GRINDER
Waldo L. Garberding, Libertyville, Ill.
Application July 21, 1958, Serial No. 750,286
19 Claims. (Cl. 51—103)

This invention relates generally to a means for infeeding a rotary grinder, and more specifically to an improved pneumatic means for obtaining a high degree of feeding accuracy in order to achieve exceptional accuracy in the workpieces' ground dimension.

This application is a continuation-in-part of my earlier application, Serial No. 675,940, filed August 2, 1957 entitled "Method and Apparatus for Infeeding a Centerless Grinder," which was abandoned with the filing of this application for patent.

Although the principles of the present invention may be included in various grinders, or attachments for grinders, a particularly useful application is made in centerless grinders operated by a method conventionally known as "infeeding." While the invention has been illustrated with a centerless grinder, it has been applied with equal efficiency to other grinders, such as center-type or cylindrical grinder.

A typical centerless grinder includes a grinding wheel rotatably mounted on a bed for relatively high speed rotation. On the bed and adjacent to the grinding wheel, a slide is provided on which there is mounted a slower rotating regulator wheel which, by movement of the slide, may be brought into nearly tangential contact with the grinding surface of the grinding wheel. A work rest is interposed between the wheels, which typically comprises a flat blade the edge of which supports a workpiece during grinding. With the slide and the regulating wheel slightly retracted, the workpiece is placed on the work rest, and thereafter, the slide is moved toward the grinding wheel to a predetermined position defined by a gap between the wheels within which the workpiece is disposed. When the slide is in its retracted position, the gap between the wheels exceeds the original dimension of the workpiece. When the slide is advanced or fed inwardly so that the gap between the wheels equals the initial diameter of the workpiece, the grinding cut begins. Further movement of the slide toward the grinding wheel produces a grinding cut on the workpiece which rotates on the work rest under the coaction of the wheels. The movement of the slide to bring together the grinding wheel and the regulating wheel for the purpose of taking a grinding cut on a workpiece interposed therebetween constitutes the well known method of centerless grinding, herein generally referred to as "infeeding."

When a centerless grinder is used in the infeeding manner, material is being ground away from the workpiece so long as the infeeding continues. However, when infeeding terminates, the workpiece continues to rotate between the regulating and grinding wheels, and therefore, a slight amount of stock continues to be removed. This period of additional workpiece rotation between the wheels, after infeeding has terminated, is known as and referred to herein as "spark-out."

In the past, it has been common to infeed the slide manually. Obtaining top quality results by this method requires that the infeeding be done by a skilled operator. Unskilled operators are unable to produce a steady infeed, to reproduce infeed rates, and to operate the machine with a constant spark-out time-period. However, even the skilled operator is unable to unfailingly produce absolutely consistent workmanship.

Automatic infeed controls have been suggested by others, and are commercially available. Typically, such automatic infeed controls are hydraulically operated. It has been found that as the temperature of the hydraulic fluid changes subsequent to warming up the machine and during the operating day, the constancy of the adjustment also changes in response to the resulting change in fluid viscosity.

Further, infeeding controls are typically provided as an optional feature when the grinder is being manufactured, it thereby being impractical heretofore to add it at a subsequent date. When it is initially provided, it has been done at a substantial cost, which cost is also increased due to the labor of inspecting and maintaining a proper fluid supply in the machine.

I have found that by maintaining the infeed rate absolutely steady, that by using the same infeed rate in successive infeedings, and by the precise control of the duration of the spark-out time, a substantially more uniform, accurate and precision result can be obtained than has heretofore been obtainable, and can be consistently obtained by an unskilled operator using a grinder adapted according this invention.

I have further found that these variables may be more than adequately controlled by the use of an automatic infeed control constructed in accordance with certain principles. Broadly speaking, infeed controls per se are well known; however, the instant infeed control produces a superior result over other known controls. Moreover the apparatus employs a structure which is somewhat more efficient to manufacture and to maintain, and hence may be obtained and operated at a fraction of the cost of heretofore obtainable infeed controls. Furthermore, this infeed control includes features not heretofore employed in such a control.

The instant invention may be constructed as part of any grinder at its manufacture, but preferably is constructed so that it can be added to any existing grinder as by an attachment embodying the principles of the instant invention.

The instant invention includes a control valve which provides pressurized air to reciprocate the piston of an actuator, to which piston there is coupled a mechanical linkage for infeeding and returning a grinder slide. The control valve, in turn, is under the control of an interval timer which promptly initiates the return or retraction of the slide at the end of a predetermined amount of spark-out time. The invention also includes features whereby the infeed control may be set to be continuously cyclically operated without manual attention.

Accordingly, it is an object of the present invention to provide an electro-pneumatically operated infeed control for a rotary grinder.

Another object of the present invention is to provide an infeed control attachment which may be removably secured to grinders for the infeed controlling thereof.

Yet another object of the present invention is to provide a means of grinder infeed control, including control of the spark-out period. A still further object of the present invention is to provide a pneumatic infeed control which operates a pneumatic workpiece ejector blade in proper synchronization therewith.

Yet another object of the present invention is to provide an improved infeed control attachment which may be continuously operated cyclically.

Many other advantages, features and additional objects of the present invention will become manifest to those versed in the art upon making reference to the detailed description and accompanying sheets of drawings in which preferred structural embodiments incorporating the principles of the present invention are shown by way of illustrative example.

Figure 1:
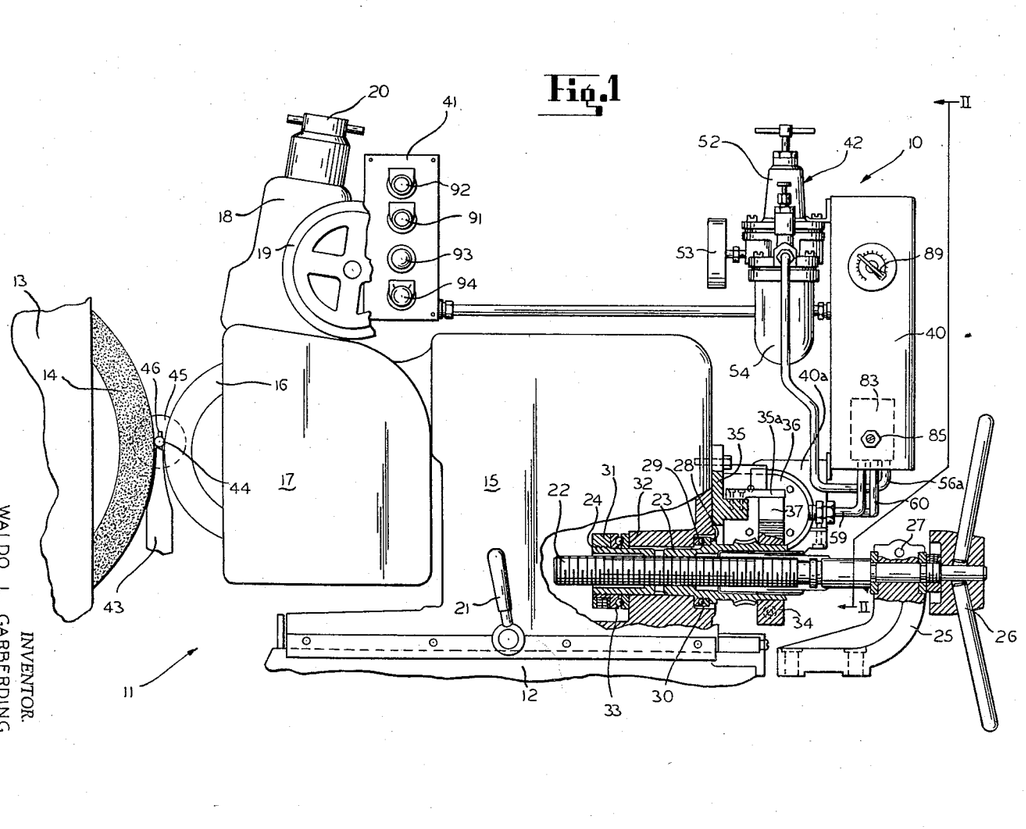
Figure 1 is a fragmentary view, partly in section, of a centerless grinder equipped with a pneumatic infeed control attachment provided in accordance with principles of the present invention.

The principles of this invention are particularly useful when embodied in a centerless grinder, and more particularly, when embodied in an infeed control attachment therefor, such as illustrated in Figure 1, generally indicated by the numeral 10.

The infeed control 10 is shown attached to a centerless grinder generally indicated by the numeral 11, including a conventional bed (not shown) supporting the lower slide 12, a grinding wheel guard 13, a grinding wheel 14, and an upper slide 15. The upper slide 15 supports a rubber regulating wheel 16, a regulating wheel guard 17, and a regulating wheel trueing or dressing mechanism 18 including a hand wheel 19 therefor, and a trueing adjustment dial 20. The upper slide 15 is slidably mounted on the lower slide 12 and may include an upper slide clamp 21 which is left in the unclamped position during infeeding.

The upper slide 15 may be manually translated with respect to the lower slide 12, which is clamped with respect to the bed in a preselected position, by means of a slide adjusting screw member 22, a threaded portion of which engages with a drive nut member 23. The outer end of the slide adjusting screw member 22 is rotatably supported, in a manner which prevents axial displacement thereof, by a slide adjusting screw bracket 25, which in turn is secured to a stationary portion of the grinder. At the extreme outer end of the slide adjusting screw 22, there is a hand pilot wheel 26, the rotation of which rotates the slide adjusting screw 22, to thereby move the upper slide 15 in a direction parallel to the axis of the screw 22. The slide adjusting screw bracket 25 typically is split at its upper end so that the upper portion of the bracket 25 may include a clamp, as indicated at 27, for locking the slide adjustment screw 22 in a fixed position.

The drive nut 23 has a shoulder 28, and the slide 15 has a shoulder 29 between which shoulders there is received a thrust bearing assembly 30. At the inner end 24 of the drive nut 23 there is a lock nut 31 which has a face which confronts a second shoulder 32 on the slide 15, between which face and shoulder there is received a thrust bearing assembly 33. The lock nut 31 is tightened to place a thrust load on the thrust bearing assemblies 30 and 33 to thereby preclude axial movement between the drive nut 23 and the slide 15. Accordingly, if the nut 23 be rotated, with the slide adjusting screw 22 stationary, it is seen that the rotation of the nut 23 causes a movement of the slide 15 in a direction parallel to the axis of the slide adjusting screw 22.

Heretofore, a hand lever has been attached to the nut 23, for manual rotation or manual infeeding. When the instant invention is constructed as an attachment for existing centerless grinders, such lever may be removed, and in its place, a gear or sector gear 34 may be installed and clamped. Further, a bracket 35 may be secured to the slide 15 for supporting a pneumatic actuator 36 which has a piston 99 connected to a rack 37 which is guided by a portion 35a of the bracket 35 to drivingly engage the teeth of the gear 34. The piston 99 of the actuator 36 is reciprocated by compressed air in a predetermined manner under the control of certain controls in a control box 40 with which a set of manual controls 41 and a pressurized air supply 42 communicate.

Also shown in Figure 1, is a work rest 43 on which a workpiece 44 rests, between the grinding wheel 14 and the regulating wheel 16. Immediately behind the workpiece 44, there is an ejection mechanism generally indicated at 45 which has a kick-out blade 46 for engaging the workpiece 44, and in this instance for displacing it toward the viewer.

Figure 2:
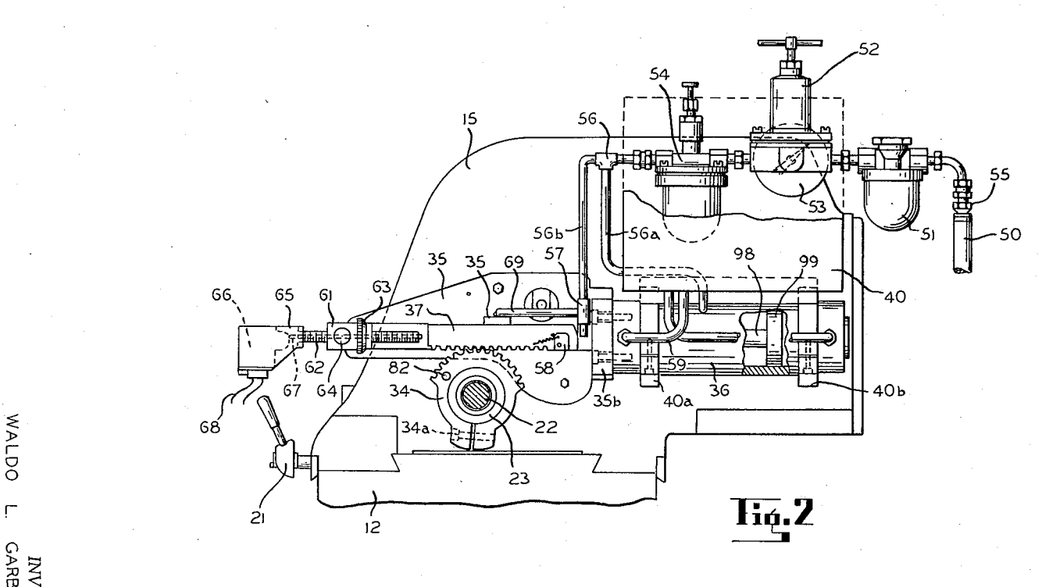
Figure 2 is an end view, partially broken away, of the infeed control of Figure 1 mounted on the slide of a centerless grinder, and taken along line II—II of Figure 1, but with electrical features omitted.

Referring now to Figure 2, the mechanical aspects of the infeed control are illustrated. In this view, it is seen that the upper slide 15 rests on the lower slide 12 and may include a slide clamp 21. To the drive nut 23, the sector gear 34 is clamped as at 34a.

The slide 15 supports the mounting bracket 35 which in turn mounts and supports the pneumatic actuator 36, such as by an integral clamp 35b. The actuator 36, in this embodiment, is of conventional structure and includes the piston 99 having a rod 98 extending outwardly therefrom, and drivably connected to the rack 37 which engages the sector gear 34.

In the preferred embodiment, the actuator 36 is operated by compressed air. Accordingly, an air line 50 leads to the device, and in series therewith there is provided a filter 51, a pressure regulator 52 having a gage 53, and a lubricator 54. If desired, a quick disconnect coupling or a valve may be provided as at 55. The controls 51–55 are supported by the control box 40 as best seen in Figure 1. An air line 56 leading from the lubricator 54 divides into two branches, one branch 56a leading into the control box 40 for connection to a pneumatic control valve 83 (Figure 1) and the other branch 56b leading to a mechanically operable plunger valve 57. An air line 69 extending from the valve 57 communicates with a second pneumatic actuator 74 used to operate the ejection mechanism 45.

The rack 37 has a pivotable cam 58 which is engageable with the plunger of the valve 57, and which is described and shown in greater detail herein. It will be noted that the actuator 36 has a pair of air lines 59 and 60 leading from opposite actuator ends or from opposite sides of the piston to the control box 40. The control box 40 has a pair of integral brackets 40a and 40b which clamp to the actuator 36 whereby the control box 40 and the pneumatic controls 42 are indirectly supported by the bracket 35.

The bracket 35 also includes an outwardly extending portion 61 which has an opening extending therethrough in alignment with the rack 37 and through which a threaded stop 62 is received. The portion 61 is slotted transversely to the opening, and in this slot there is disposed an internally threaded adjusting knob 63 which fits snugly therein and which threadably engages with the stop 62. It can be seen that rotation of the knob 63 produces an axial displacement of the stop 62 toward and away from the rack 37. If desired, a lock screw 64 may also be included to lock the stop 62 in a selected position.

To the outer end of the stops 62, there is secured a flanged bracket 65 which supports an electrical limit switch 66. The stop 62 is made hollow and a pin 67 is disposed therein. The pin 67 is an actuating pin which projects slightly from the opposite end of the stop 62, so that the rack 37 engages the end of the pin 67 to actuate the switch 66 before the rack 37 engages the stop 62. A pair of lead wires 68 from the switch 66 communicates with the control box 40.

Figure 5:
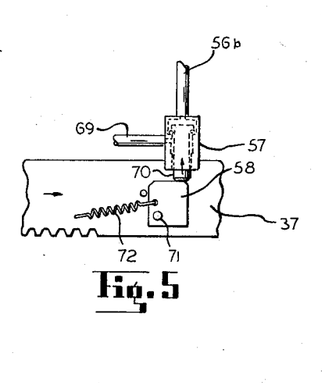
Figure 5 is a fragmental view comprising an enlarged fragmentary portion of Figure 2.
Figure 6:
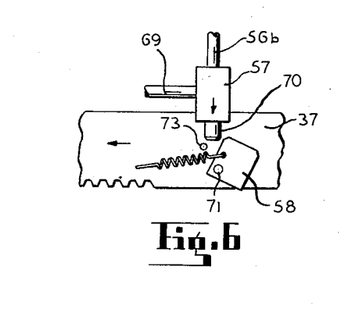
Figure 6 is similar to Figure 5, but with certain parts relatively displaced.

Referring now to Figures 5 and 6, the portion of the rack 37 having the pivotable or rockable cam 58 disposed adjacent to the plunger operated valve 57 is shown. The valve 57 includes an externally directed stem or plunger 70 which, when moved in an inward direction as shown in Figure 5 by the arrow, causes unseating of the valve to permit air to flow from the line 56b to the line 69. This valve is self-seating, so that when the plunger is in the outward position as indicated in Figure 6, the air pressure in the line 56b is retained therein, while any pressure in line 69 is exhausted or vented, such as through a clearance surrounding the plunger 70. It can be seen that the pressure at the line 56b causes a seating of this valve 57. The cam 58 is pivotably or rockably connected to the rack 37 as by a hinge pin 71, and is biased by a spring 72 or otherwise against a stop 73, so that when the rack 37 moves as indicated in Figure 5 to the right, the cam 58 raises the plunger 70 to operate the valve 57. After a predetermined time, determined by the rate of movement of the rack 37 and the length of the camming surface of the cam 58, the plunger 70 drops off the cam just above the stops 73 to reclose the valve 57.

Referring to Figure 6, when the rack 37 is moved in the opposite direction, the plunger 70 engages the edge of the cam 58 which yields and pivots about the pin 71 without causing a lifting of the plunger 70.

Figure 3:
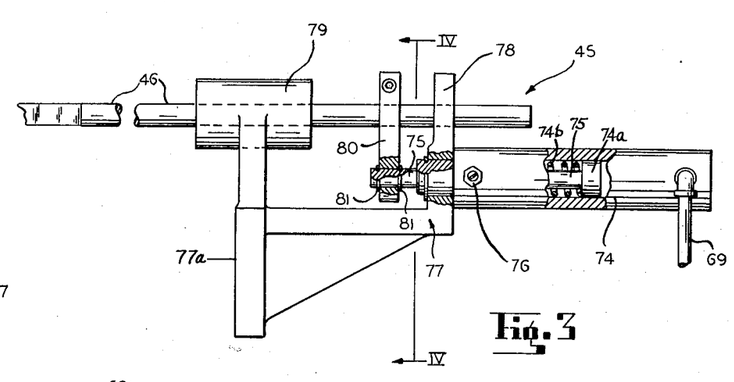
Figure 3 is a side elevational view, partially in cross-section, of a portion of the ejection mechanism.
Figure 4:
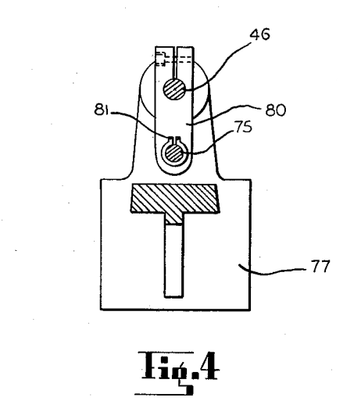
Figure 4 is a cross-sectional view taken along line IV—IV of Figure 3.

Referring now to Figures 3 and 4, there is generally shown the ejection mechanism 45. The mechanism 45 includes the second pneumatic actuator 74 which has a conventional piston 74a and a rod 75, both biased to the right as shown by an internal spring 74b. The line 69 from the valve 57 communicates with one end of the actuator 74 to provide pressurized air to one face of the piston 74a to displace it, and to load the spring 74b. The cylinder of the actuator 74 has a metering valve 76 which communicates with the non-pressurized side of the piston 74a. Thus when air is brought in rapidly to operate the actuator 74, air on the opposite side of the piston is slowly brought out through the metering valve 76 at an adjustable rate whereby the piston rod 75 will move to the left as illustrated with an adjustable velocity. This velocity may be adjusted so that the workpiece being ejected from the grinding and regulating wheel is given the proper amount of kinetic energy. Thus the mechanism may be adjusted to provide more energy for ejection of a larger piece than for a smaller workpiece.

The actuator 74 is secured to a bracket 77 which has a mounting surface 77a which may be secured to the grinder at any convenient location. Bracket 77 further has a pair of guides 78 and 79 which have aligned apertures for receiving kick-out blade 46 which engages the workpiece. The kick-out blade 46 is held by a clamp 80 which may be secured to the rod 75 in any convenient way, e.g. by means of a pair of snap rings 81.

The use of the ejection mechanism 45 as disclosed herein is advantageous. However, conventional relatively complex ejection mechanisms may be used with the infeed control of this invention. A conventional manual infeed lever typically includes a pin which is arcuately displaced when the infeed lever is moved. Accordingly, as seen in Figure 2, a pin 82, which is similar to the pin carried on a conventional infeed lever, may be secured to the sector gear 34 for the purpose of actuating a conventional ejecting mechanism.

Figure 7:
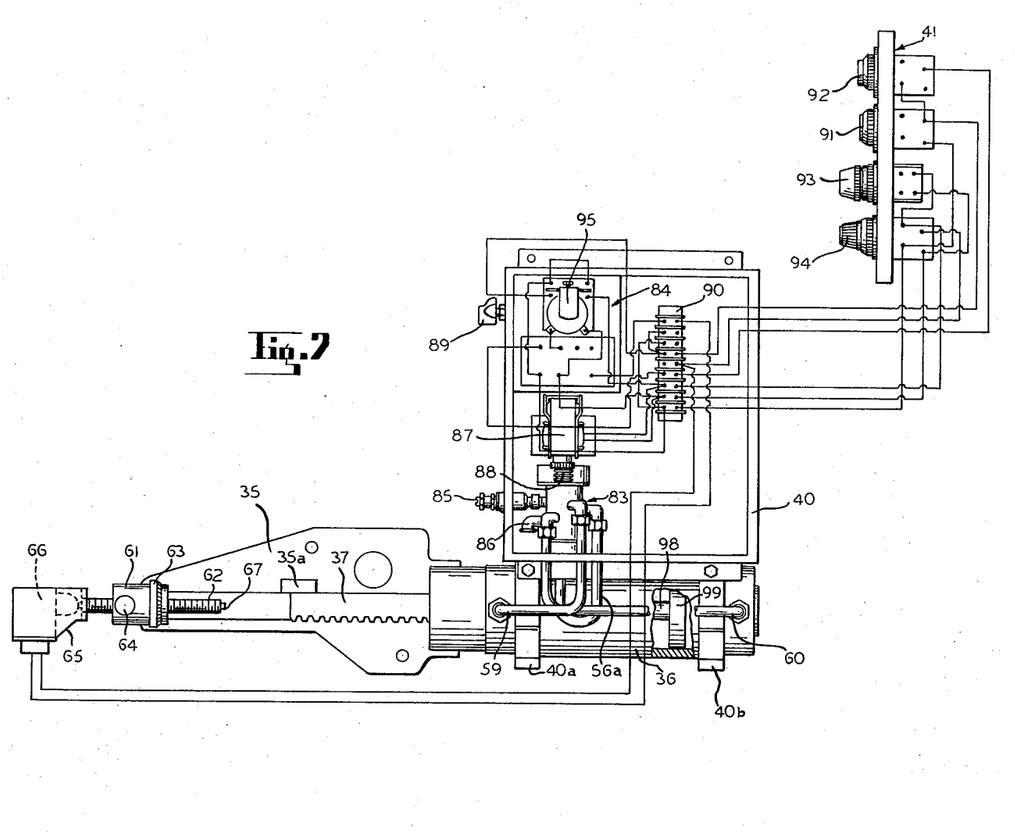
Figure 7 is generally similar to Figure 2, showing the electrical connections between the various components, but with some of the pneumatic elements omitted.

Referring now to Figure 7, the details of the control box 40 and the operator's station controls 41 are shown more or less diagrammatically. The principal control elements within the box 40 are the pneumatic control valve 83 and an adjustable-interval electric timer 84. The control valve 83 receives pressurized air from the line 56a as already described. The structural details of the valve 83 are conventional, and provide that when the movable element is in one position, pressurized fluid is directed to the line 59 for returning and for holding the rack in the retracted or returned position. When the movable element of the valve 83 is in a second position, the pressurized air of the line 56 is directed to the line 60 for moving the piston 99 of the actuator 36 and the rack 37 to the left, which produces infeeding of the slide 15. When the line 59 and the line 60 are respectively pressurized, the line 60 and the line 59 respectively are unpressurized and communicate with an adjustable valve 85, the adjustment of which determines the rate at which the rack 37 may be displaced for a given inlet pressure in the line 56a. Preferably, the valve 83 has an additional port 86 which may be operatively connected in parallel with the port leading to the bleed valve 85 only when the control valve 83 is pressurizing the line 59, thus insuring a somewhat faster return stroke of the rack 37.

The control valve 83 in the instant embodiment is actuated by an electrical solenoid 87 which has an armature or plunger connected to the moving element of the control valve 83. These moving parts are biased by a spring 88 to position the control valve 83 so that air pressure is being applied to the line 59 whenever the current to the solenoid 87 is interrupted, or in the event that the current should fail. If desired, the solenoid 87 may be made integral with the valve 83.

The solenoid 87 is actuated by current which is under the control of the interval timer 84, secured to the control box 40. The timer 84 preferably includes an adjustment under the control of a knob 89 for selectably determining a predetermined time interval. Adjacent to the timer, there is preferably disposed a junction block 90, to which a source of current (not shown) may also be connected. Further, the manual control means 41 is connected with the timer 84.

The control means 41 includes a momentary switch 91 for starting an infeeding cycle, a momentary switch 92 for interrupting or stopping any infeeding cycle, a pilot light 93 which is connected in parallel with the solenoid 87, so that it is illuminated at any time that the rack 37 is being moved in an infeeding direction or is in an infed position, and a rotary manual selector switch 94 which in one position energizes the solenoid 87 by by-passing the timer, and in another position, allows the timer to control the energization of the solenoid 87. The detailed construction of the switches 91, 92, and 94, and the pilot light 93, do not form a part of this invention.

When the circuit controlled by the momentary switch 91 is closed, a relay 95 is closed and provides power to the solenoid 87. The closing of the switch 91 may also be used to energize a circuit within the timer to start the running of a time cycle whose duration is dependent upon the position of the knob 89. A more preferred form of the circuit employs the use of the switch 66 to start the running of this time period. Upon the termination of the timed interval, the timer 84 opens the relay 95 and hence the circuit to the solenoid 87 whereupon the spring 88 may reposition the valve 83. The internal features of the timer 84 need not be explained for a full understanding of this invention. However, a timer of this type is described in the United States patent to Farmer No. 2,650,301.

Accordingly, the timer 84 so controls the control valve 83 as to first cause an infeeding of the slide at a controlled rate to a predetermined position representing the smallest gap to be used between the grinding and regulating wheels. Upon reaching this position, the spark-out period begins. The duration of the spark-out is measured and limited to a constant value determined by the dimensional requirement for the workpiece. When the preselected spark-out period has ended, the slide is immediately returned to the starting position. During the return of the slide, the workpiece is ejected, and thereafter the next workpiece is placed into the grinder preparatory to the next infeeding step of the grinder. The workpiece may be so placed by hand, or an automatic workpiece feeding mechanism (not shown) may be employed for this purpose.

Since the rack is to be infed for a fixed distance at a controlled rate, the elapsed time of such infeeding is a constant period. This constant period of time may be added to the spark-out time to produce a timed interval which may be initiated by the closing of the switch 91, which is closed once for each and every workpiece. However, if the stop 62 be repositioned to slightly change the ground dimension of the workpiece, a slight resetting of the knob 89 is necessary. This readjustment of the knob 89 can be omitted if the switch 91 be used to initiate the closing of the circuit to the solenoid, and if the actuation of the switch 66 be used to initiate the timed interval. Accordingly, the timed interval may span both the infeeding and the spark-out, or more preferably may span solely the spark-out.

The operation of the centerless grinder with the infeed control of this invention will now be explained. At the outset, the pilot knob 26 is positioned, the clamp 27 being loose, and the rack 37 holding the drive nut 23 stationary, so as to position the upper slide 15 with respect to the lower slide 12. This is normally done with the rack 37 in a retracted position, so that this positioning establishes the open distance between the grinding and regulating wheels.

Thereafter, the screw 22 is locked by the clamp 27 and the selector switch 94 is actuated. The closing of the actuator switch 94 energizes the pilot light 93 and the solenoid 87 to thereby admit air from the pressure regulator 52 to the line 60, thereby advancing the rack 37 against the stop 62. With the selector switch 94 in this position, the rack 37 remains against the stop 62. This movement of the rack 37 rotates the sector gear 34 and the drive nut 23 counterclockwise as seen in Figure 2, which movement advances the slide 15 and the regulating wheel 16 toward the grinding wheel 14 by an amount determined by the position of the adjustable stop 62. Accordingly, positioning the adjustable stop 62 determines the closed distance between the regulating and grinding wheels. If the diameter produced on the workpiece by the infeed grinding is not that desired, the adjustable stop 62 may be accurately repositioned by rotating the adjustment knob 63, each graduation thereon representing ten millionths of an inch difference in diameter on the workpiece.

Depending upon various factors such as the grade of wheel used, the material being ground, the depth of cut, the finish desired, and the like, the valve 85 for controlling the rate of advance of the rack 37 may be adjusted to produce a practicable maximum rate of advance. Further, the timer knob 89 is adjusted to produce the desired spark-out time, usually less than one second in total duration.

With return of the selector switch 94 to the original position, the control is now ready for normal operation. When the start button 91 is depressed, either momentarily or for an extended period of time, the circuit is made which energizes the solenoid 87 and thereby actuates the pneumatic control valve 83 to admit pressurized air to the line 60 leading to the actuator 36. Air on the other side of the piston is thereby displaced through the line 59 and through the metering valve 85, the position of which determines the rate at which the actuator 36 advances the rack 37 and therefore the sector gear 34.

By this advance, the nut 23 is rotated, and since it is axially fixed with respect to the slide and since the screw 22 is fixed, the slide is thereby displaced, moving the regulating wheel toward the grinding wheel and forcing the workpiece thereagainst. The infeeding continues until the rack 37 abuts or engages the adjustable stop 62. When the stop 62 is so engaged, infeeding terminates and spark-out begins. The duration of the spark-out period must be very carefully controlled, and the timer 84 is used to so terminate this period. The timed interval may be initiated by the original closing of the switch 91. If the timer 84 is so connected, a timer range on the order of twelve seconds will usually be sufficient to take care of the infeeding and spark-out time. On the other hand, if the switch 66 is used to initiate the timing of the spark-out period, a timer range of about three seconds is usually more than adequate, since a typical spark-out time has a duration of less than one second.

The timer 84 signals the end of the spark-out period by interrupting the current to the solenoid 87. This interruption allows the spring 88 to return the control valve 83 to the original position, whereby air pressure is applied through the line 59 and the pressurized air on the opposite side of the piston of the actuator 36 is bled out or exhausted through the line 60 and through both the bleed valve 85 and the dump port 86. Accordingly, the bleed valve 85 is effective to adjust the stroke-rate of the rack primarily in an infeeding direction, while a high speed return of the rack 37 and hence the slide 15 is always assured.

The controls are preferably so constructed, that prolonged depression or actuation of the switch 91 initiates but one cycle, so that the switch 91 must be released and depressed to initiate the next cycle. Each time that the solenoid 87 is energized, so also is the pilot light 93 which serves to warn the operator that the grinder is undergoing infeeding or is in an infed position. This is particularly important since the total stroke of the slide 15 per cycle is only a few thousandths of an inch, and therefore it is difficult or impossible to tell by simple inspection whether the regulating wheel is in the advanced or retracted position.

The stop button 92 is provided as an emergency button or switch, the closing of which acts on the timer 84 to produce an instantaneous deenergization of the solenoid 87.

Accordingly, a constant pressure determined by the setting of the pressure regulator 52 normally acting through the line 59 and against one face of the piston 99 with the actuator 36, insures that the slide 15 is normally maintained in a returned, retracted, or open position. The control also includes the self-seating plunger valve 57 disposed adjacent to the cam 58 on the rack 37 for operation thereby as shown in Figures 5 and 6. The line 69 from the valve 57 communicates with the actuator 74 of the ejector mechanism 45. Accordingly, when the timer 84 has terminated the spark-out period, by deenergizing the solenoid 87 to permit actuation of the control valve 83 which produces a return of the rack 37, the cam 58 engages the plunger 70 of the valve 57 to permit air pressure from the regulator 52 to flow through the line 56, the line 56b, the valve 57, and the line 69, into the actuator 74. This pressure displaces the rod 75 in a forward direction at a rate controlled by the valve means 76 for limiting the rate of advance of the rod 75. The rod 75, being mechanically coupled to the kick out blade 46, forces the workpiece 44 out from between the wheels. Accordingly, the length of the cam 58 must be sufficient to permit the foregoing to occur. Just before the rack 57 reaches the end of its stroke, the plunger 70 drops off the cam 58, thereby permitting the reseating of the plunger valve 57 and the venting or dumping of air from the line 69, the kick out blade 46 and the rod 75 being returned to the retracted position by the return spring 74b.

Since the cam 58 is pivoted to rock about the pin 71, when the rack 37 is advanced to produce infeeding, the plunger 70 of the valve 57 engages with the cam 58 in a manner which rocks the cam 58 out of position, the plunger 70 remaining stationary. Accordingly, the valve 57 is actuated only on the return stroke of the rack 37.

Accordingly, an infeed control has been provided which may be utilized for short or long distances of infeeding, or for fast or slow rates of infeeding, and which includes means for controlling the duration of the spark-out period which follows the infeeding portion of the cycle. Further, it has been shown that the instant invention can be provided as a part of a centerless grinder, or may be constructed as an attachment for existing centerless grinders. Still further, an infeed control may be fitted with an ejection mechanism which is coordinated with the infeed of the slide, and which is operated under the control of the interval timer.

Figures 8, 9:
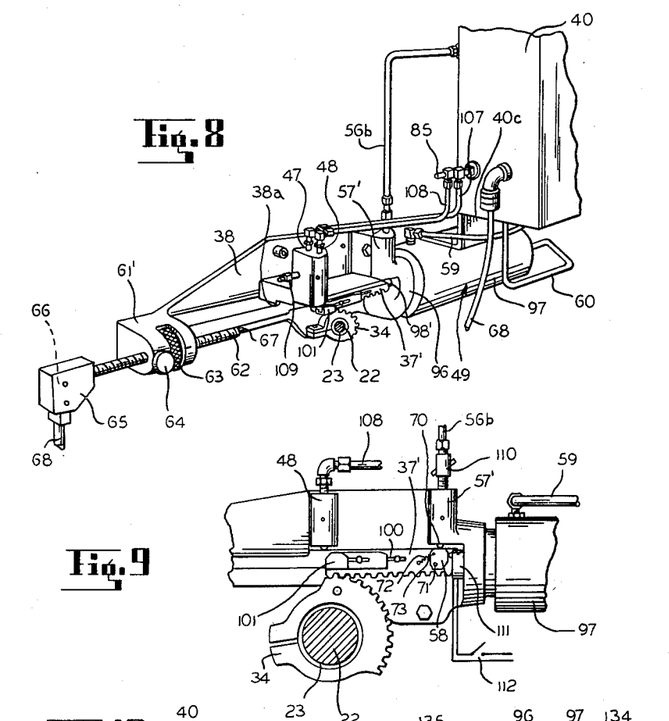
Figure 8 is a fragmentary perspective view of a slightly modified form of pneumatic infeed control provided in accordance with the principles of the present invention.
Figure 9 is an enlarged fragmentary elevational view of a portion of Figure 8 showing additional details thereof.
Figure 10:
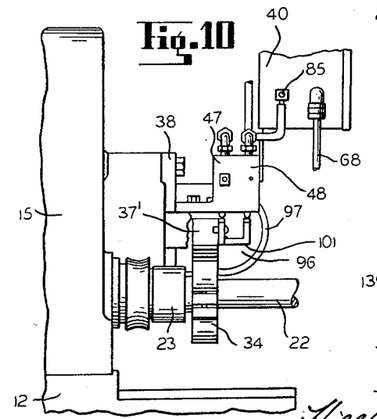
Figure 10 is a fragmentary end view of the infeed control of Figure 8 secured to a centerless grinder, also shown fragmentarily.

Referring now to Figure 8, there is shown a slightly modified form of the embodiment already described. Similar numerals have been used to describe components which are identical to that of Figure 1, while primed numerals have been used to indicate components which are substantially the same. Thus it will be noted that the general organization of the embodiment shown in Figure 8 is similar to that of the embodiment shown in Figures 1–7. Since the details of the manual control means 41 and the control box 40 are the same, they are not repeated in this view. It will be noted that the principal features of the first-described embodiment are also incorporated in the embodiment of Figure 8. In addition however, there are certain other features which have been included. This embodiment has been provided with a bracket 38 which is adapted to be directly carried by the slide 15 and which includes the integral portion 61' as described before. The bracket 38 also includes an integral guide portion 38a for guiding a rack 37'. The bracket 38 also includes integral portions which define the body of the valve 57' as well as the bodies of a pair of additional plunger valves 47, 48, the purpose of which is described below.

Figure 15:
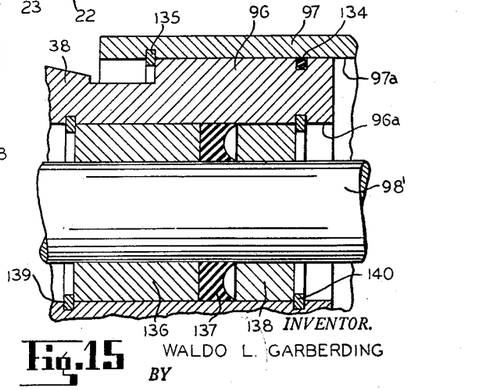
Figure 15 is an enlarged fragmentary sectional view of the rod-end of the actuator.

Secured to the bracket 38 is a cylinder assembly or first actuator 49 which has a rod end cap 96. The rod end cap 96 is also an integral part of the bracket 38 as best seen in Figure 15. The control box 40 is secured as by a bracket 40c to a cylinder 97 which comprises a part of the actuator 49.

Figure 11:
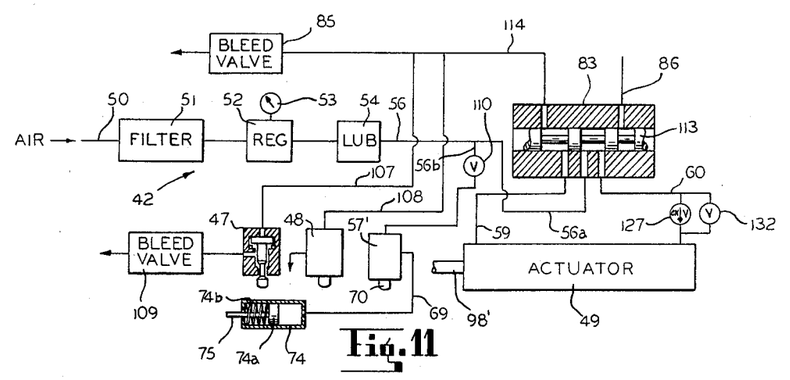
Figure 11 is a diagrammatic representation of the pneumatic circuit employed in the embodiment of Figure 8.
Figure 12:
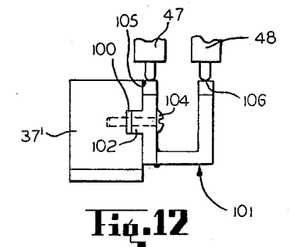
Figure 12 is an enlarged detail of Figure 10.
Figure 13:
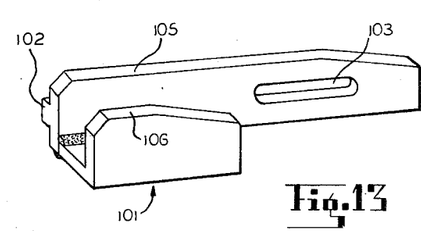
Figure 13 is an enlarged perspective view of a part shown in Figure 8.

As seen in Figures 8–10, 12, and 13, the rack 37' has been provided with a longitudinal groove 100 which is adapted as by tapped spaced holes to receive and support an additional cam 101 which is spaced intermediate the pivotable cam 58 and the stop 62. The cam 101 is provided with an elongated guide lug 102 which is received within the rack slot 100 and slidable therealong. The cam 101 is also transversely slotted as at 103 to receive a screw 104 by which the cam 101 may be selectably disposed along the length of the rack 37'. The cam 101 is provided with a pair of spaced cam surfaces 105, 106, which respectively register with and engage plungers of the plunger valves 47, 48, which are identical to that of plunger valve 57' in their internal structure. As best seen in Figure 13, each of the track surfaces 105, 106 is bevelled at the left end to enable the plungers of the valves 47, 48 to be raised thereby onto the cam surfaces. Each of the cam surfaces 105, 106 gradually falls away at its right end to produce a gradual closing of the valves 47, 48. It is to be noted that when the valves 47, 48 are spaced adjacent to each other, the longitudinal spacing of the fall-out of the surfaces 105, 106 produces consecutive operation of the valves 47, 48. The valves 47, 48 are connected by a pair of lines 107, 108 respectively to a point intermediate the bleed valve 85 and the control valve 83, as best seen in Figures 8 and 11. Further, the valve 47 is provided with a bleed valve 109.

Also shown on Figure 9 is a valve 110 which is disposed intermediate the valve 57' and the line 56b.

As best seen in Figure 9, this embodiment has also been provided with a recycling switch 111 which is under the control of a switch 112. The switch 111 is a push button switch which is actuated by the rack 37' upon its return to the right as shown, and more specifically in this embodiment is actuated by the cam 58. The lead wires leading to the switch 111 are connected across the start switch 91 so that each time that the rack 37' returns to a slide withdrawing position, a new cycle is automatically initiated. The switch 112 may mechanically be incorporated as a part of the manual selector switch 94 which may be provided with an additional position wherein switch 112 is closed to provide for automatic recycling of the infeed control.

Referring now to Figure 11, when the solenoid 87 is energized, the spool 113 of the valve 83 moves to the left to admit air under pressure through the line 60 thereby displacing the piston rod 98' to the left, a movement which causes infeeding of the grinder slide 15. This movement also causes a displacement of used air from the actuator 49 through the line 59 to the line 114 where it is directed simultaneously to the bleed valve 85, the line 107 and plunger valve 47, and the line 108 and plunger valve 48. At the beginning of the stroke, the cam 101 is in such position that the cam surfaces 105, 106 hold the plungers of the valves 47, 48 in an upward or inward position. This allows simultaneous bleeding of the used air from the line 59 through each of the bleed valve 85, the bleed valve 109, and the plunger valve 48. This simultaneous bleeding or dumping of air permits an initial rapid advance of the slide 15 until cam surface 106 closes the valve 48. The first rapid feed is typically used to advance the slide up to the point where the workpiece is engaged. Infeeding continues with the valve 47 open to produce what is an intermediate speed of feed, which feed speed is such as to allow an efficient grinding rate. When the cam surface 105 gradually closes the valve 47, any remaining air may bleed out slowly through the valve 85 for the last portion of the grinding stroke. This last portion may be described as a fine feed during which time the piece part becomes accurately rounded and precisely sized. The fine feed continues until the rack 37' engages the stop 62. It will be noted that the rack 37' a moment earlier engages the pin 67 to close the switch 66 and to thereby initiate the operation of the timer. Thus closing the switch 66 and starting the timer has no immediate effect on the infeeding. However, at the end of a predetermined selected time, the timer terminates the spark-out period by de-energizing the solenoid so that the spool 113 shifts in the opposite direction.

This shift causes pressurized air to move from the control valve 83 through the line 59 to move the piston rod 98' to the right, thereby effecting a retraction or opening movement of the slide 15.

This shifting of the spool 113 also enables used air in the actuator 49 to leave by the line 60 and be directly dumped or exhausted through the port 86.

Where it is desired to use automatic recycling such as may be effected by the switch 111, it is frequently necessary for a manual or automatic feeder to have more time at the retracted portion of the piston rod stroke to effect such feeding. This may be accomplished by initially having the cam 101 positioned so that the valves 47 and 48 are both closed when the rack 37' is fully retracted. This arrangement does not actually stop infeeding, but provides a short portion of an infeed cycle which is at the ultimate fine feed speed during which time, for feeding purposes, the slide is effectively stationary.

If desired, the valve 57' may be omitted, in which event a separately operated ejector mechanism would be utilized. It is also possible, to omit one of the valves 47, 48 if desired, but preferably, both such valves should be used.

I have found that conventional grinding machines equipped with this infeed control attachment may be advantageously used to remove .00001" to .040" of material per pass or grinding cycle.

In this embodiment, during the higher rate movements of the actuator 49, it is moved at a somewhat faster speed than is normally employed in the grinding art, while at its slower speeds, it is moved at a somewhat slower speed than is commonly employed in the grinding art.

This combination of speeds has made it possible to obtain results which are of a substantially greater degree of accuracy, and which represent an unexpected improvement over prior structures. Formerly, it was commonplace to work to diameter and out of roundness tolerances of .0001". I have found that it is now practical with this embodiment to work to diameter and out of roundness tolerances of .000005".

The rapid traverse or high speed advance is used to take up slack which is found in old and worn machines and which therefore cause a time loss per cycle. It is also used to take up losses which may be caused by the use of relatively wider spacings or openings between the grinder wheels.

The bleed valve 85 in the embodiment of Figure 8 is set so that the resulting infeed speed is about one-fourth of that normally used, and the cam 101 is so set with relation to the stop 62 that this speed is utilized for the last .001" to be removed from the diameter of the workpiece. This relationship is true for any diameter of workpiece. When the valve 47 is opened and the valve 48 is closed, the bleed valves 109 and 85 jointly produce an infeeding speed during the main portion of the cutting part of the cycle which is about one-third faster than normally used for infeed grinding.

Figure 14:
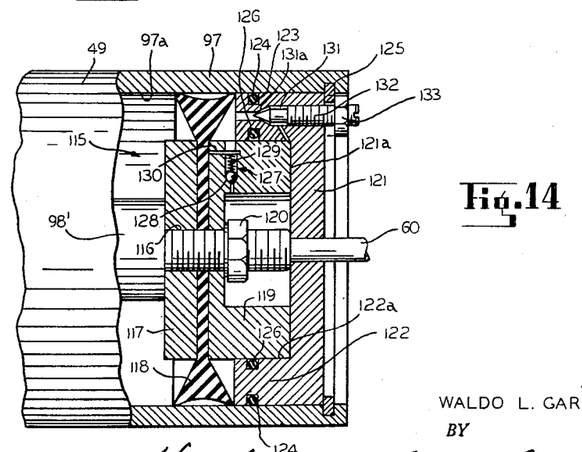
Figure 14 is an enlarged sectional view of the head-end of the actuator.

It can be seen that for high speed operation of the actuator 49, means must be provided to regulate the speed thereof also in the retracting direction. Referring now to Figure 14, there is shown a fragmentary cross-sectional view of the actuator 49 with the piston thereof in the right hand or retracted position.

The actuator 49 includes the cylinder 97 which has an inner cylindrical surface 97a within which is disposed a piston assembly generally indicated at 115. The end of the piston rod 98' which is remote from the rack 37' has a portion of reduced diameter 116 which is threaded and on which are carried a back-up member 117, a resilient piston 118, and a second piston 119 of reduced diameter. The members 117—119 are secured to the piston rod 98' by a nut and washer 120, which mate with the reduced portion 116.

The cylinder 97 is closed by an end cap 121 which has an inwardly axially extending portion 122, the outer surface of which is provided with an outwardly directed sealing groove 123 in which there is disposed a static O-ring 124 which with the inner surface 97a forms a seal. A snap ring 125 is carried by the cylinder 97 to hold the end cap 121 in position.

The portion 122 of the cap 121 is cylindrical and has an inner cylindrical surface 122a which is coaxial with the cylindrical surface 97a and which receives the piston 119 therein. The surface 122a is also provided with an O-ring 126 which with the piston 119 forms a sliding seal.

The air line 60 is connected to the end cap 121 centrally thereof so that is communicates with the face of the piston 119 which is directed oppositely to the rod 98'.

A check valve 127 comprising a ball 128, a spring 129, and a pin 130, communicates the side of the piston 119 which is adjacent to the end cap 121 with that side of the piston 118 which is also adjacent to the end cap 121. The check valve 127 is so arranged that when the piston 118 is moved away from the end cap 121, by compressed air entering through the air line 60, such air under pressure acts to unseat the check valve 127, and thereby to act on the entire combined areas of the pistons 118 and 119. This arrangement permits a maximum force to be applied to the rod 98' which does not change when the assembly begins to move, since there is no seal between the piston 119 and the end cap 121 at the end cap surface 121a.

When air is admitted under pressure through the air line 59 to act on the opposite side of the piston 118, the assembly 115 moves to the right to ultimately take the position as shown. In doing so, the piston 118 forces air outwardly through the line 60 without appreciable restriction until the piston 119 enters the cylindrical surface 122a and forms a seal with the O-ring 126. This seal has the effect of trapping air between the piston 118 and the seal 126. Nor does the check valve 127 provide a means for the escape of this air. However, the end cap 121 is provided with a passage 131 which includes an integral valve seat 131a, which passage extends from the side of the piston 118 adjacent to the end cap 121 to the side of the piston 119 adjacent to the end cap 121, thereby spanning the seal 126 and the check valve 127. The end cap 121 is threaded and receives the needle member 132 of a bleed valve, the position of which determines the effective size or flow area of the seat 131a, whereby the air trapped by the O-ring 126 may be exhausted and dumped through the line 60 at a selected rate. The valve member 132 may be locked in position by a nut 133 which is disposed intermediate the ends of the snap ring 125 and against the outer surface of the end cap 121. Thus the valves 127 and 132 jointly provide for a restricted and adjustable control rate at which the slide 15 may be returned.

Referring again to Figure 15, the other end of the rod 98' extends through the end cap 96 which is integral with the bracket 38 as already described. The end cap 96 is provided with an O-ring 134 which also forms a seal with the inner surface 97a of the cylinder 97. A snap ring 135 serves to hold the end cap 96 within the cylinder 97. The end cap 96 is provided with a bore 96a within which there is disposed a cylindrical bearing 136, such as of "Oilite," a resilient sealing member 137 of U-shaped cross-section, a short cylindrical bushing 138, and a pair of snap rings 139, 140 acting to hold the members 136–138 in position. Thus the end cap 96 supports the cylinder 97 and also supports the piston rod 98'.

Although various minor modifications might be suggested by those versed in the art, it should be understood that I wish to embody within the scope of the patent warranted hereon, all such embodiments as reasonably come within my contribution to the art.

I claim as my invention:

1. In a grinding machine having a grinding wheel and a regulating wheel, a slide movably supporting one of the wheels for motion toward and from the other wheel, a nut member and a screw member, said members being threadably interengaged and drivably supported on the slide in axial alignment with the direction of said motion, each of said members being independently rotatable with respect to said slide, a hand wheel corotatably secured to one of said members, and means for locking said one member in fixed position, the improvement comprising: a pneumatic control valve; a pneumatic actuator having a piston, and communicating with said valve for control thereby; a sector gear corotatably secured to the other of said members; a rack engaging said sector gear and drivably connected to said piston for reciprocation thereby; and a timer for operating said valve.

2. In a grinding machine having a grinding wheel and a regulating wheel, a slide movably supporting one of the wheels for motion toward and from the other wheel, a nut member and a screw member, said members being threadably interengaged and drivably supported on the slide in axial alignment with the direction of said motion, each of said members being independently rotatable with respect to said slide, a hand-wheel corotatably secured to one of said members, and means for locking said one member in fixed position, the improvement comprising: a pneumatic control valve; a pneumatic actuator having a piston, and communicating with said valve for control thereby; a sector gear corotatably secured to the other of said members; a rack engaging said sector gear and drivably connected to said piston for reciprocation thereby; a stop carried by the slide and adapted to be adjusted in a direction perpendicular to said motion, said stop being disposed in alignment with said rack and engageable therewith for limiting the movement thereof in a slide-advancing direction; and a timer for operating said valve.

3. In a grinding machine having a grinding wheel and a regulating wheel, a slide movably supporting one of the wheels for motion toward and from the other wheel, a nut member and a screw member, said members being threadably interengaged and drivably supported on the slide in axial alignment with the direction of said motion, each of said members being independently rotatable with respect to said slide, a hand wheel corotatably secured to one of said members, and means for locking said one member in fixed position, the improvement comprising: a bracket adapted for removable attachment to the slide; a pneumatic actuator rigidly supported by said bracket, said actuator including a piston; a pneumatic control valve communicating with said actuator for controlling the reciprocation of said piston; a gear corotatably secured to the other of said members; a rack axially spaced from said piston and operatively connected thereto for joint reciprocation, said rack being also in operative engagement with said gear; a stop carried by said bracket and adapted to be adjusted in a direction perpendicular to said motion, said stop being disposed in alignment with said rack and engageable therewith so as to limit rack movement in a slide-advancing direction; and a timer for operating said valve.

4. In a grinding machine having a grinding wheel and a regulating wheel, a slide movably supporting one of the wheels for motion toward and from the other wheel, a nut member and a screw member, said members being threadably interengaged and drivably supported on the slide in axial alignment with the direction of said motion, each of said members being independently rotatable with respect to said slide, a hand wheel corotatably secured to one of said members, and means for locking said one member in fixed position, the improvement comprising: a pneumatic control valve; a pneumatic actuator having a piston, and communicating with said valve for control thereby; a sector gear corotatably secured to the other of said members; a rack engaging said sector gear and drivably connected to said piston for reciprocation thereby; means for controlling said timer; and means operative independently of said timer to operate said valve so as to fully advance and to continuously hold the slide in an advanced position, thereby facilitating setting up the machine for a particular working dimension.

5. In a grinding machine having a grinding wheel and a regulating wheel, a slide movably supporting one of the wheels for motion toward and from the other wheel, a nut member and a screw member, said members being threadably interengaged and drivably supported on the slide in axial alignment with the direction of said motion, each of said members being independently rotatable with respect to said slide, a hand wheel corotatably secured to one of said members, and means for locking said one member in fixed position, the improvement comprising: a pneumatic control valve; a pneumatic actuator having a piston, and communicating with said valve for control thereby; a sector gear corotatably secured to the other of said members; a rack engaging said sector gear and drivably connected to said piston for reciprocation thereby; a stop carried by the slide and adapted to be adjusted in a direction perpendicular to said motion, said stop being disposed in alignment with said rack and engageable therewith for limiting the movement thereof in a slide-advancing direction; a timer operative at the end of a preselected period to control said valve so as to effect returning of the slide; and a switch connected to said timer, said switch being carried by and movable with said adjustable stop, and arranged to be operated by said rack to initiate said preselected timing period.

6. In a grinding machine having a grinding wheel and a regulating wheel, a slide movably supporting one of the wheels for motion toward and from the other wheel, a nut member and a screw member, said members being threadably interengaged and drivably supported on the slide in axial alignment with the direction of said motion, each of said members being independently rotatable with respect to said slide, a hand wheel corotatably secured to one of said members, and means for locking said one member in fixed position, the improvement comprising: a pneumatic control valve and a pneumatic plunger valve, each adapted to be connected to a source of pressurized air; a pair of pneumatic actuators each having a reciprocable piston rod and each communicating with one of said valves for control thereby; a sector gear corotatably secured to the other of said members; a rack engaging said sector gear and adapted to momentarily engage and operate said plunger valve only shortly before the end of the slide-returning stroke, said rack being drivably connected to the piston rod of said actuator which is connected to said control valve for reciprocation thereby; said piston rod of second pneumatic actuator being adapted to operate a workpiece ejector; and a timer for operating said valve.

7. In a grinding machine having a grinding wheel and a regulating wheel, a slide movably supporting one of the wheels for motion toward and from the other wheel, a nut member and a screw member, said members being threadably interengaged and drivably supported on the slide in axial alignment with the direction of said motion, each of said members being independently rotatable with respect to said slide, a hand wheel corotatably secured to one of said members, and means for locking said one member in fixed position, the improvement comprising: a pneumatic control valve and a pneumatic plunger valve, each adapted to be connected to a source of pressurized air; a pair of pneumatic actuators each having a reciprocable piston rod and each communicating with one of said valves for control thereby; a sector gear corotatably secured to the other of said members; a rack engaging said sector gear, said rack being drivably connected to the piston rod of said actuator which is connected to said control valve for reciprocation thereby; a cam rockably supported on said rack and adapted to momentarily actuate said plunger valve only on the slide returning stroke of said rack shortly before the end thereof, and rock past said plunger valve on the slide-advancing stroke; said piston rod of second pneumatic actuator being adapted to operate a workpiece ejector; and a timer for operating said valve.

8. In a grinding machine having a grinding wheel and a regulating wheel, a slide movably supporting one of the wheels for motion toward and from the other wheel, a nut member and a screw member, said members being threadably interengaged and drivably supported on the slide in axial alignment with the direction of said motion, each of said members being independently rotatable with respect to said slide, a hand wheel corotatably secured to one of said members, and means for locking said one member in fixed position, the improvement comprising: a pneumatic actuator having a piston; a sector gear corotatably secured to the other of said members; a rack engaging said sector gear and drivably connected to said piston for reciprocation thereby; a pneumatic control valve adapted to be connected to a source of pressurized air and communicating with said actuator both to supply pressurized air thereto and to control the dumping of exhausted air therefrom; a plurality of adjustable valve means communicating with said control valve for severally controlling the rate at which all exhausted air is dumped by said control valve, and disposed so as to control the rate of slide movement in both direction; and a timer for operating said control valve.

9. In a grinding machine having a regulating wheel, a slide movably supporting one of the wheels for motion toward and from the other wheel, a nut member and a screw member, said members being threadably interengaged and drivably supported on the slide in axial alignment with the direction of said motion, each of said members being independently rotatable with respect to said slide, a hand wheel corotatably secured to one of said members, and means for locking said one member in fixed position, the improvement comprising: a bracket adapted for removable attachment to the slide; a first pneumatic actuator rigidly supported by said bracket, said actuator including a piston; a pneumatic control valve communicating with said actuator for controlling the reciprocation of said piston; a pneumatic plunger valve rigidly supported by said bracket axially adjacent to said first actuator, each of said valves being adapted to be connected to a source of pressurized air; said control valve being operative to control the reciprocation of said piston, both by supplying pressurized air to said first actuator and by controlling the dumping of exhausted air therefrom; a plurality of adjustable valve means communicating with said control valve for severally controlling the rate at which all exhausted air is dumped by said control valve, and disposed so as to control the rate of slide movement in both directions; a second pneumatic actuator having a piston rod, and communicating with said plunger valve for control thereby; said piston rod of second pneumatic actuator being adapted to operate a workpiece ejector; a sector gear corotatably secured to the other of said members; a rack engaging said sector gear, said rack being drivably connected to the piston of said first actuator for reciprocation thereby; a cam rockably supported on said rack and adapted to momentarily actuate said plunger valve only on the slide-returning stroke of said rack shortly before the end thereof, and to rock past said plunger valve on the slide-advancing stroke; a stop carried by said bracket and adapted to be adjusted in a direction perpendicular to said motion, said stop being disposed in alignment with said rack and engageable therewith so as to limit rack movement in a slide-advancing direction; a timer for operating said valve; means for controlling said timer; and means operative independently of said timer to operate said valve so as to fully advance and to continuously hold the slide in an advanced position, thereby facilitating setting up the machine for a particular working dimension.

10. In a grinding machine having a grinding wheel and a regulating wheel, a slide movably supporting one of the wheels for motion toward and from the other wheel, a nut member and a screw member, said members being threadably interengaged and drivably supported on the slide in axial alignment with the direction of said motion, each of said members being independently rotatable with respect to said slide, a hand wheel corotatably secured to one of said members, and means for locking said one member in fixed position, the improvement comprising: a pneumatic actuator having a piston; a sector gear corotatably secured to the other of said members; a rack engaging said sector gear and drivably connected to said piston for reciprocation thereby; a pneumatic control valve having inlet, operating, and exhaust ports, said inlet port being adapted to be connected to a source of pressurized air, and said operating port communicating with said actuator both to supply pressurized air thereto and to return exhausted air therefrom to said control valve to be dumped; a bleed valve and at least one pneumatic plunger valve each connected to said exhaust port, and said plunger valve disposed to have its plunger actuated by movement of said rack for altering the rate at which exhausted air is dumped, thereby controlling two rates of slide movement; and a timer for operating said control valve.

11. In a grinding machine having a grinding wheel and a regulating wheel, a slide movably supporting one of the wheels for motion toward and from the other wheel, a nut member and a screw member, said members being threadably interengaged and drivably supported on the slide in axial alignment with the direction of said motion, each of said members being independently rotatable with respect to said slide, a hand wheel corotatably secured to one of said members, and means for locking said one member in fixed position, the improvement comprising: a pneumatic actuator having a piston; a sector gear corotatably secured to the other of said members; a rack engaging said sector gear and drivably connected to said piston for reciprocation thereby; a pneumatic control valve having inlet, operating and exhaust ports, said inlet port being adapted to be connected to a source of pressurized air, and said operating port communicating with said actuator both to supply pressurized air thereto and to return exhausted air therefrom to said control valve to be dumped; a bleed valve and at least one pneumatic plunger valve each connected to said exhaust port; a cam adjustably secured to said rack and disposed to actuate the plunger of said plunger valve in response to movement of said rack for altering the rate at which exhausted air is dumped, thereby controlling two rates of slide movement; and a timer for operating said control valve.

12. In a grinding machine having a grinding wheel and a regulating wheel, a slide movably supporting one of the wheels for motion toward and from the other wheel, a nut member and a screw member, said members being threadably interengaged and drivably supported on the slide in axial alignment with the direction of said motion, each of said members being independently rotatable with respect to said slide, a hand wheel corotatably secured to one of said members, and means for locking said one member in fixed position, the improvement comprising: a pneumatic actuator having a piston; a sector gear corotatably secured to the other of said members; a rack engaging said sector gear and drivably connected to said piston for reciprocation thereby; a pneumatic control valve having inlet, operating, and exhaust ports, said inlet port being adapted to be connected to a source of pressurized air, and said operating port communicating with said actuator both to supply pressurized air thereto and to return exhausted air therefrom to said control valve to be dumped; a bleed valve and a pair of pneumatic plunger valves each connected to said exhaust port, and said plunger valves disposed to have their plungers consecutively actuated by movement of said rack for altering the rate at which exhausted air is dumped, thereby controlling three rates of slide movement; and a timer for operating said control valve.

13. In a grinding machine having a grinding wheel and a regulating wheel, a slide movably supporting one of the wheels for motion toward and from the other wheel, a nut member and a screw member, said members being threadably interengaged and drivably supported on the slide in axial alignment with the direction of said motion, each of said members being independently rotatable with respect to said slide, a hand wheel corotatably secured to one of said members, and means for locking said one member in fixed position, the improvement comprising: a pneumatic actuator having a piston; a sector gear corotatably secured to the other of said members; a rack engaging said sector gear and drivably connected to said piston for reciprocation thereby; a pneumatic control valve having inlet, operating, and exhaust ports, said inlet port being adapted to be connected to a source of pressurized air, and said operating port communicating with said actuator both to supply pressurized air thereto and to return exhausted air therefrom to said control valve to be dumped; a bleed valve and a pair of pneumatic plunger valves each connected to said exhaust port; a two-track cam adjustably secured to said rack and disposed for each of the tracks to consecutively actuate the plunger of one of said plunger valves in response to movement of said rack for altering the rate at which exhausted air is dumped, thereby controlling three rates of slide movement; and a timer for operating said control valve.

14. In a grinding machine having a grinding wheel and a regulating wheel, a slide movably supporting one of the wheels for motion toward and from the other wheel, a nut member and a screw member, said members being threadably interengaged and drivably supported on the slide in axial alignment with the direction of said motion, each of said members being independently rotatable with respect to said slide, a hand wheel corotatably secured to one of said members, and means for locking said one member in fixed position, the improvement comprising: a pneumatic control valve; a pneumatic actuator having a piston, and communicating with said valve for control thereby; a sector gear corotatably secured to the other of said members; a rack engaging said sector gear and drivably connected to said piston for reciprocation thereby; an electrically actuated timer for operating said valve to effect a single grinding cycle; and a switch actuated by said rack at the end of a grinding cycle and connected to said timer for recycling said timer.

15. In a grinding machine having a grinding wheel and a regulating wheel, a slide movably supporting one of the wheels for motion toward and from the other wheel, a nut member and a screw member, said members being threadably interengaged and drivably supported on the slide in axial alignment with the direction of said motion, each of said members being independently rotatable with respect to said slide, a hand wheel corotatably secured to one of said members, and means for locking said one member in fixed position, the improvement comprising: a mounting bracket adapted for removable attachment to the slide; a pneumatic actuator having a rod-end cap comprising an integral part of said bracket, said actuator including a piston rod guided by said cap; a pneumatic control valve pneumatically communicating with said actuator to control the same; a sector gear corotatably secured to the other of said members; a rack engaging said sector gear and drivably connected to said piston rod for reciprocation thereby; and a timer for operating said valve.

16. In a grinding machine having a grinding wheel and a regulating wheel, a slide movably supporting one of the wheels for motion toward and from the other wheel, a nut member and a screw member, said members being threadably interengaged and drivably supported on the slide in axial alignment with the direction of said motion, each of said members being independently rotatable with respect to said slide, a hand wheel corotatably secured to one of said members, and means for locking said one member in fixed position, the improvement comprising: a pneumatic actuator having a piston; a sector gear corotatably secured to the other of said members; a rack engaging said sector gear and drivably connected to said piston for reciprocation thereby; a pneumatic control valve adapted to be connected to a source of pressurized air and communicating with said actuator both to supply pressurized air thereto and to control the dumping of exhausted air therefrom; adjustable valve means operatively intermediate said control valve and said pneumatic actuator for controlling the rate at which air is dumped from said actuator by said control valve, and disposed so as to control rate of slide movement only in the return direction; and a timer for operating said control valve.

17. In a pneumatic device having a cylinder with a first inner surface, a first piston reciprocably and sealingly disposed therein against the inner surface, and a pair of end caps for said cylinder, the improvement of: means at one of the end caps defining a second inner cylindrical surface concentric with said first surface and of a smaller diameter; a second piston coaxially secured to said first piston and reciprocably receivable within said second inner surface to form a seal therebetween; said one cap having a port communicating with said second piston for admitting and exhausting air; a bleed valve arranged to communicate said port with a point located on the other side of said seal but on the same side of the first piston as said port; and a check valve operatively parallel to said bleed valve and arranged to block air flow to said port and to permit flow therefrom.

18. In a pneumatic device having a cylinder with a first inner surface, a first piston reciprocably and sealingly disposed therein against the inner surface, and a pair of end caps for said cylinder, the improvement of: means integral with one of the end caps defining a second inner cylindrical surface concentric with said first surface and of a smaller diameter; a second piston coaxially secured to said first piston and reciprocably receivable within said second inner surface to form a seal therebetween; said one cap having a port communicating with said second piston for admitting and exhausting air; a bleed valve the body of which is integral with said one end cap and which includes a passage communicating said port with a point located on the other side of said seal but on the same side of the first piston as said port; and a check valve the body of which is integral with said second piston, said check valve being pneumatically parallel to said bleed valve and arranged to block air flow to said port and to permit flow therefrom.

19. In a grinding machine having a grinding wheel and a regulating wheel, a slide movably supporting one of the wheels for motion toward and from the other wheel, a nut member and a screw member, said members being threadably interengaged and drivably supported on the slide in axial alignment with the direction of said motion, each of said members being independently rotatable with respect to said slide, a hand wheel corotatably secured to one of said members, and means for locking said one member in fixed position, the improvement comprising: a pneumatic actuator having a first piston reciprocably and sealingly carried by a first inner cylindrical surface thereof, and a piston rod connected to said first piston; a sector gear corotatably secured to the other of said members; a rack engaging said sector gear and driveably connected to said piston rod for reciprocation thereby; a pneumatic control valve adapted to be connected to a source of pressurized air and communicating with a pneumatic port in said actuator both to supply pressurized air thereto and to control the dumping of exhausted air therefrom; means at said port defining a second inner cylindrical surface concentric with said first surface and of a smaller diameter; a second piston disposed adjacent to said port and coaxially secured to said first piston, said second piston being reciprocably receivable within said second inner surface to form a seal therebetween; a bleed valve arranged to communicate said port with a point located on the other side of said seal but on the same side of the first piston as said port; and a check valve operatively parallel to said bleed valve and arranged to block air flow to said port and to permit flow therefrom; and a timer for operating said control valve.

References Cited in the file of this patent

UNITED STATES PATENTS

| | | |
|---|---|---|
| 1,891,662 | Booth | Dec. 20, 1932 |
| 1,938,756 | Booth | Dec. 12, 1933 |
| 2,590,102 | Hopkins | Mar. 25, 1952 |
| 2,639,563 | Swainey | May 26, 1953 |